M. FRIEDLY.
Spoon.
No. 211,233. Patented Jan. 7, 1879.
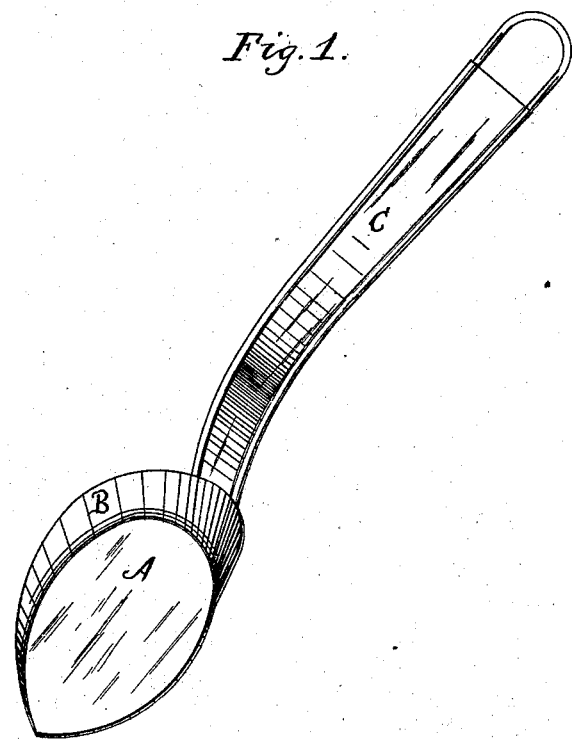
Witnesses:
F. M. Burnham.
H. H. Bliss
Inventor:
Michael Friedly
by H. H. Doubleday
atty

UNITED STATES PATENT OFFICE.

MICHAEL FRIEDLY, OF DUNKIRK, OHIO, ASSIGNOR OF ONE-THIRD HIS RIGHT TO MAHON BROTHERS, OF SAME PLACE.

IMPROVEMENT IN SPOONS.

Specification forming part of Letters Patent No. 211,233, dated January 7, 1879; application filed January 21, 1878.

*To all whom it may concern:*

Be it known that I, MICHAEL FRIEDLY, of Dunkirk, in the county of Hardin and State of Ohio, have invented certain new and useful Improvements in Spoons; and I do hereby declare that the following is a full, clear, and exact description thereof, which will enable others skilled in the art to which they appertain to make and use the same, reference being had to the accompanying drawings, and to letters of reference marked thereon, which form a part of this specification.

This invention relates to an improvement in spoons, especially in those used in such culinary operations as the poaching or frying of eggs, the skimming of milk, &c.

Its object is to provide a spoon wherewith the egg or other article can be lifted or turned without breaking or otherwise marring.

Figure 1 is a perspective view of my improved spoon. Fig. 2 is a view of a modified construction.

The spoon is formed with a flat base or bottom, A, adapted to readily pass under the egg that is poaching or frying, or other article, for the purpose of lifting or turning it. This bottom part is preferably oval or egg-shaped in form, but may be of any desired shape. B is a flange or upwardly-extending wall, running part way around the spoon and situated upon one side, for holding upon it the article that is being lifted. This flange is formed by stamping or turning up an extension of the flat bottom A. It extends about one-half way around, leaving the opposite side open, so that the edge of the bottom can pass easily beneath the egg. C represents the handle, of any desired shape and construction. It may be formed in one piece with the bowl, or be attached thereto by soldering or riveting.

In Fig. 2, I have shown a modification of the spoon, in which the bottom A is provided with perforations $a$, through which water or other surplus liquid may escape.

What I claim, and desire to secure by Letters Patent, is—

The herein-described spoon having the flat bottom A, the partial wall B, and the side opposite to said wall open, substantially as and for the purposes set forth.

In testimony that I claim the foregoing as my own I affix my signature in presence of two witnesses.

MICHAEL FRIEDLY.

Witnesses:
J. J. WOOD,
C. M. JONES.